No. 737,445. Patented August 25, 1903.

UNITED STATES PATENT OFFICE.

EDUARD MÜNCH, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION OF BADEN.

REDDISH-BROWN AZO DYE.

SPECIFICATION forming part of Letters Patent No. 737,445, dated August 25, 1903.

Application filed April 10, 1903. Serial No. 152,064. (No specimens.)

*To all whom it may concern:*

Be it known that I, EDUARD MÜNCH, doctor of philosophy and chemist, a subject of the Grand Duke of Baden, residing at Ludwigshafen-on-the-Rhine, in the Kingdom of Bavaria, Empire of Germany, have invented new and useful Improvements in Azo Coloring-Matters, of which the following is a specification.

I have discovered a new azo coloring-matter obtained by combining diazotized anthranilic acid with para-cresol. It is of great value for the production of dyeings on animal fiber, which when treated with chromates or mixtures of chromates and chrome salts are converted into reddish-brown shades of great fastness.

The following example will serve to further illustrate the nature of my invention; but it is not confined to this example. The parts are by weight.

Example: Diazotize one hundred and thirty-seven (137) parts of anthranilic acid and introduce while stirring the diazo solution obtained into a solution of one hundred and eight (108) parts of para-cresol and one hundred and twenty (120) parts of caustic-soda lye, containing thirty-five (35) per cent. of NaOH, in sufficient water and containing an excess of carbonate of soda.

When the formation of the coloring-matter is complete, salt it out by means of common salt, collect by filtration, and press and dry. The coloring-matter so obtained is soluble in warm water, giving a reddish-brown solution, which turns orange in color on the addition of a little caustic-soda solution. It is soluble in concentrated sulfuric acid, giving a yellowish-red solution, and upon reduction yields anthranilic acid and amido-para-cresol.

I claim—

The azo coloring-matter which can be obtained from anthranilic acid and para-cresol, which is soluble in warm water giving a reddish-brown solution, which on the addition of a little caustic-soda lye turns orange in color, which is soluble in concentrated sulfuric acid giving a yellowish-red solution, and upon reduction yields anthranilic acid and amido-para-cresol.

In testimony whereof I have hereunto set my hand in the presence of two subscribing witnesses.

EDUARD MÜNCH.

Witnesses:
ERNEST F. EHRHARDT,
H. W. HARRIS.